United States Patent Office 3,536,493
Patented Oct. 27, 1970

---

3,536,493
OPTICALLY SENSITIZED PHOTOGRAPHIC SILVER HALIDE EMULSIONS
Roy A. Jeffreys, Wealdstone, Harrow, England, assignor to Eastman Kodak Company, Rochester, N.Y., a corporation of New Jersey
No Drawing. Original application Oct. 9, 1963, Ser. No. 314,864. Divided and this application Apr. 18, 1969, Ser. No. 817,565
Int. Cl. G03c 1/14, 1/22
U.S. Cl. 96—120                                12 Claims

ABSTRACT OF THE DISCLOSURE

Sensitizing dyes, such as merocyanine, hemicyanine and styryl dyes, for photographic silver halide emulsions are prepared by a novel process which comprises heating a mixture of (1) a compound having the formula:

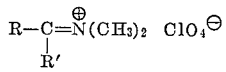

wherein R and R' each represents an alkyl group and (2) an intermediate such as an amino substituted aldehyde, a 2-alkylthioheterocyclic quaternary salt, a 2-acetanilidovinyl heterocyclic quaternary salt, an alkoxymethylene derivative of ketomethylene heterocyclic compounds and ethylisoformanilide.

---

This application is a division of my copending application Ser. No. 314,864, filed Oct. 9, 1963.

This invention is related to sensitizing dyes and more particularly to a novel process for making sensitizing dyes from N,N-dimethylisopropylimmonium perchlorate and their use in sensitizing photographic silver halide emulsions.

Styryl, hemicyanine, merocyanine and complex dyes are known in the art. These dyes are usually made by condensing a suitable cyclammonium quaternary salt with an appropriate intermediate under suitable conditions. For example, the synthesis of certain styryl dyes is described by Brooker et al. U.S. Pat. 2,494,032, issued January 10, 1950, the synthesis of certain hemicyanine dyes is described by White U.S. Pat. 2,369,509, issued Feb. 13, 1945, and the synthesis of certain merocyanines is described by Aubert and Knott U.S. Pat. 2,652,397, issued Sept. 15, 1953. These reactions are usually conducted in a suitable solvent in the presence of a basic condensing agent and at a temperature between room temperature and the reflux temperature of the solvent in the reaction mixture.

New methods for preparing sensitizing dyes are desired. It is therefore an object of my invention to provide a novel method for preparing sensitizing dyes of the styryl class, the hemicyanine class, merocyanine class and complex dye class derived from N,N-dimethylisopropylimmonium perchlorate.

Another object is to provide a process of making dyes comprising treating N,N-dimethylisopropylimmonium perchlorate with an intermediate selected from the class consisting of an amino substituted aldehyde, a 2-alkylthioheterocyclic quaternary salt, a 2-acetanilidovinyl heterocyclic quaternary salt, an alkoxymethylene derivative of a ketomethylene heterocyclic compound and ethylisoformanilide.

Another object is to provide sensitizing dyes made by my process. Another object is to provide photographic silver halide emulsions sensitized with my dyes.

Still other objects will become evident from a consideration of the following specification and claims.

These and other objects are accomplished according to my invention by heating a mixture of (1) a compound having the formula:

(I)

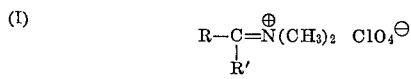

wherein R and R' each represents alkyl groups, e.g., methyl, ethyl, propyl, butyl, etc., and (2) an intermediate, e.g., an amino substituted aldehyde, a 2-alkylthioheterocyclic quaternary salt, a 2-acetanilidovinyl heterocyclic quaternary salt, an alkoxymethylene derivative of ketomethylene heterocyclic compounds and ethylisoformanilide. Merocyanines and hemicyanines can also be made to advantage by heating a mixture of (1) a compound having the formula:

(II)

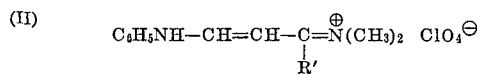

in which R' is as defined previously, and acetic anhydride with (2) an intermediate, e.g., a heterocyclic quaternary salt with a reactive methyl group, or a ketomethylene heterocyclic compound. In place of the compound of Formula II and acetic anhydride in this reaction one can use a compound of formula:

(II-A)

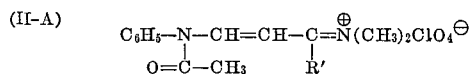

in which R' is as defined previously. Compounds of Formula II–A are prepared by refluxing the appropriate compound of Formula II with acetic anhydride.

These reactions of my invention are carried out advantageously in a suitable inert organic solvent, and at a temperature between room temperature and the reflux temperature of the reaction mixture. It is advantageous to conduct the reactions in the presence of a basic condensing agent.

The inert solvents used to advantage include ethanol, propanol, isopropanol, 1,4-dioxane, pyridine, quinoline, etc. The basic condensing agents include organic tertiary amines, such as the trialkylamines, e.g., triethylamine, tripropylamine, triisopropylamine, tributylamine, etc., the N,N-dialkylanilines, e.g., N,N-dimethylaniline, N,N-diethylaniline, etc., the N-alkylpiperidines, e.g., N-methylpiperidine, N-ethylpiperidine, etc.

The amino substituted aldehydes used to advantage in my synthesis for the preparation of styryl dyes, includes the aldehydes represented by the formula:

(III)

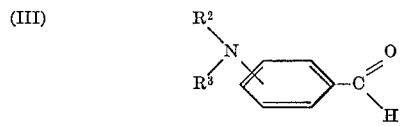

wherein $R^2$ and $R^3$ each represent the same or a different group, such as, the hydrogen atom, an alkyl group, e.g., methyl, ethyl, propyl, butyl, amyl, 2-chloroethyl, 2-cyanoethyl, 2-hydroxyethyl, benzyl, etc., an aryl group, e.g., phenyl, p-chlorophenyl, p-tolyl, p-ethylphenyl, etc.

The 2-alkylthio, 2-acetanilidovinyl heterocyclic quaternary salts, and reactive methyl heterocyclic quaternary salts used to advantage in my synthesis for making hemicyanine dyes include the quaternary salts represented by the formulae:

(IV)

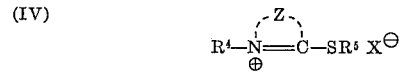

(IVa)

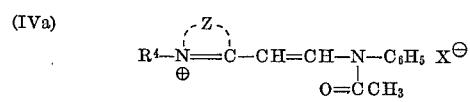

and (V) 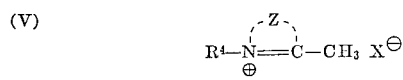

wherein R⁴ represents an alkyl group, e.g., methyl, ethyl, propyl, isopropyl, butyl, isobutyl, amyl, allyl (i.e., vinylmethyl), ethoxycarbonylmethyl, β-hydroxyethyl, β-acetoxyethyl, sulfobutyl, etc.; R⁵ represents an alkyl group, e.g., methyl, ethyl, etc., an aryl group, e.g., phenyl, p-chlorophenyl, p-tolyl, etc.; Z represents the nonmetallic atoms necessary to complete a heterocyclic nucleus containing from five to six atoms in the heterocyclic ring, such as those selected from the group consisting of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g. α - naphthothiazole, β - naphthothiazole, 5 - methoxy-β - naphthothiazole, 5 - ethoxy - β - naphthothiazole, 8-methoxy - α - naphthothiazole, 7 - methoxy - α - naphthothiazole, etc.), those of the thionaphtheno-7',6',4,5-thiazole series (e.g. 4'-methoxythianaphthene-7',6',4,5-thiazole, etc.), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g. α-naphthoxazole, β-naphthoxazole, etc.), those of the selenazole series (e.g. 4-methylselenazole, 4-phenylselenazole, etc.), those of the benzoselenazole series (e.g. benzoselenazole, 5-chlorobenzoselenazole, 5-methoxybenzoselenazole, 5-hydroxybenzoselenazole, tetrahydrobenzoselenazole, etc.), those of the naphthoselenazole series (e.g. α-naphthoselenazole, β-naphthoselenazole, etc.), those of the thiazoline series (e.g., thiazoline, 4-methylthiazoline, etc.), those of the 2-quinoline series (e.g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hypdroxyquinoline, etc.), those of the 4-quinoline series (e.g. quinoline, 6-methoxyquinoline, 7-methylquinoline, 8-methylquinoline, etc.), those of the 1-isoquinoline series (e.g. 1-isoquinoline, 3,4-dihydro-1-isoquinoline, etc.), those of the 3-isoquinoline series (e.g. 3-isoquinoline, etc.), those of the 3,3-dialkyl-3H-indole series (e.g. 3,3-dimethyl-3H-indole, 3,3,5-trimethyl-3H-indole, 3,3,7-trimethyl-3H-indole, etc.), the pyridine series (e.g. pyridine, 5-methylpyridine, etc.), etc., the 2-pyridine series (e.g., 2-pyridine, 5-methyl-2-pyridine, etc.), the 4-pyridine series (e.g., 4-pyridine, 5-methyl-4-pyridine, etc.); those of the imidazole series (e.g., imidazole, 1-ethyl-4-phenylimidazole, 4,5-dimethylimidazole, etc.); the benzimidazole series (e.g., 1-ethylbenzimidazole, 1-phenylbenzimidazole, etc.), and those of the naphthimidazole series (e.g., 1-methyl-α-naphthimidazole, β-naphthimidazole, 5-methoxy-β-naphthimidazole, etc.), and X⊖ represents an acid anion, such as chloride, bromide, iodide, perchlorate, sulfonate, thiocyanate, p-toluenesulfonate, benzenesulfonate, methylsulfate, ethylsulfate, etc.

The ketomethylene heterocyclic compounds used to advantage in my synthesis for making merocyanine dyes include the compounds represented by the formula:

(VI) 

wherein W represents the nonmetallic atoms necessary to complete a heterocyclic nucleus containing from five to six atoms in the heterocyclic ring, such as, those of the 2-pyrazolin-5-one series (e.g. 3-methyl-1-phenyl-2-pyrazolin-5-one, 1-phenyl-2-pyrazolin-5-one, 1-(2-benzothiazolyl)-3-methyl-2-pyrazolin-5-one, etc.), those of the isoxazolin-5-one series (e.g. 3-phenyl-2-isoxazolin-5-one, 3-methyl-2-isoxazolin-5-one, etc.), those of the 2-indolinone series (e.g. 1-alkyl-2-indolinone, etc.), those of the 2,4,6-triketohexahydropyrimidine series (e.g. barbituric acid or 2-thiobarbituric acid as well as their 1-alkyl (e.g. 1-methyl, 1-ethyl, 1-propyl, 1-heptyl, etc.), or 1,3-dialkyl (e.g. 1,3-dimethyl, 1,3-diethyl, 1,3-di-propyl, 1,3-diisopropyl, 1,3-dicyclohexyl, 1,3-di(β-methoxyethyl), etc.), or 1,3-diaryl [e.g. 1,3-diphenyl, 1,3-di(p-chlorophenyl), 1,3-di(p-ethoxycarbonylphenyl), etc.], or 1-aryl (e.g. 1-phenyl, 1-p-chlorophenyl, 1-p-ethoxycarbonylphenyl, etc.) or 1-alkyl-3-aryl (e.g. 1-ethyl-3-phenyl, 1-heptyl-3-phenyl, etc., derivatives), those of the rhodanine series (i.e. 2-thio-2,4-thiazolidine dione series), such as rhodanone, 3-alkylrhodanines (e.g. 3-ethylrhodanine, 3-allylrhodanine, etc.) or 3-arylrhodanines (e.g. 3-phenylrhodanine, etc.), etc., those of the 2(3H)-imidazo[1,2-a]pyridone series, those of the 5,7-dioxo-6,7-dihydro-5-thiazolo[3,2-a]pyrimidine series (e.g. 5,7-dioxo-3-phenyl-6,7-dihydro-5-thiazolo[3,2-a]pyrimidine etc.), those of the thianaphthenone series (e.g. 3-(2H)-thianaphthenone, etc.), those of the 2-thio-2,5-thiazolidinedione series (i.e. the 2-thio-2,5(3H, 4H)-thiazoledione series) (e.g. 3-ethyl-2-thio-2,5-thiazolidinedione, etc.), those of the 2,4-thiazolidinedione series (e.g. 2,4-thiazolidinedione, 3-ethyl-2,4-thiazolidinedione, 3 - phenyl - 2,4 - thiazolidinedione, 3 - α - naphthyl-2,4-thiazolidinedione, etc.), those of the thiazolidinone series (e.g. 4-thiazolidinone, 3-ethyl-4-thiazolidinone, 3-phenyl-4-thiazolidinone, 3-α-naphthyl-4-thiazolidinine, etc.), those of the 4-thiazolinone series (e.g. 2-ethylthio - 4 - thiazolinone, 2 - alkylphenylamino - 4 - thiazolinones, 2-diphenylamino-4-thiazolinone, etc.), those of the 2-imino-2,4-oxazolinone (i.e. pseudohydantoin) series, those of the 5-imidazolinone series (e.g. 2-propylthio-5-imidazolinone, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom).

The derivatives of ketomethylene heterocyclic compounds used to advantage in my synthesis for making merocyanine dyes include the compounds represented by the formulae:

(VII) 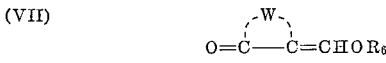

and (VIII) 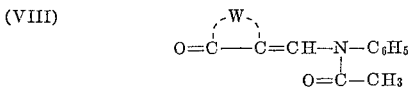

wherein W is as defined previously, and R₆ represents an alkyl group, e.g., methyl, ethyl, propyl, butyl, amyl, benzyl (i.e. phenylmethyl), allyl, etc.

Intermediates having Formulas III, IV, V, VI, VII and VIII are well known in the art and are described in the literature and in numerous patents, and need not be described further here.

The merocyanine dyes made by my synthesis from rhodanine and similar thiones can be alkylated with an alkylester and condensed further to give complex dyes.

The dyes of my invention are used to advantage in manufacturing photographic silver halide emulsions, serving to alter the sensitivity thereof. The type of silver halide emulsions that are sensitized with my dyes include any of those prepared with hydrophilic colloids that are known to be satisfactory for dispersing silver halides, for example, emulsions comprising materials such as, gelatin, albumin, agar-agar, gum arabic, alginic acid, etc., and hydrophilic synthetic resins such as polyvinyl alcohol, polyvinyl pyrrolidone, cellulose ethers, partially hydrolyzed cellulose acetate, and the like.

In the preparation of photographic emulsions, my dyes are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of my dyes.

The concentration of my dyes in the emulsion can be varied widely, i.e., from about 5 to about 100 mg. per liter of flowable emulsion. The specific concentration will vary according to the type of light-sensitive material in the emulsion and according to the effects desired. The suitable and most economical dye concentration for any given emulsion will be apparent to those skilled in the art upon making the tests and observations customarily used in the art of emulsion making.

To prepare a gelatino-silver halide emulsion sensitized with one of my new dyes, the following procedure is satisfactory: A quantity of the dye is dissolved in a suitable solvent and the volume of this solution containing from 5 to 100 mg. of dye is slowly added to about 1000 cc. of the gelatino-silver halide emulsion. With most of my dyes, 10 to 20 mg. of dye per liter of emulsion suffice to produce the maximum sensitizing effect with the ordinary gelatino-silver bromide (including bromoiodide and chlorobromide) emulsions. With fine grain emulsion, which include most of the ordinarily employed gelatino-silver chloride emulsions, somewhat larger concentrations of the dye may be necessary to secure optimum sensitizing effect, while the preceding has dealt with gelatino emulsions, it will be understood that these remarks apply generally to any emulsions wherein part or all of the gelatin is replaced by another suitable hydrophilic colloid such as mentioned above.

The above statements are only illustrative and are not to be understood as limiting the invention in any sense, as it will be apparent that my dyes can be incorporated by other methods in many of the emulsions employed in the art. For instance, the dyes can be incorporated by bathing a plate or film upon which the emulsion has been coated, in the solution of the dye in an appropriate solvent.

The following typical examples will serve to further describe my invention, however, it is to be understood that my invention is not to be limited to these examples.

EXAMPLE 1

1-p-dimethylaminophenyl-3-dimethylimmonium-1-butene perchlorate

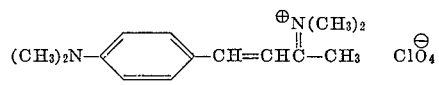

p-dimethylaminobenzaldehyde (3 g.) and N,N-dimethylisopropylimmonium perchlorate (3.7 g.) in ethanol (12 cc.) with piperidine (2 drops), were refluxed together for ½ hr. The solution was chilled, and the solid product filtered off, washed with water and ether, and recrystallized from methanol-ether as purple-brown prisms, M.P. 244° C.

The dye sensitized a silver chlorobromide emulsion from 480 mμ, to 660 mμ, and a silver bromoiodide emulsion to 630 mμ with a peak at 580 mμ.

EXAMPLE 2

5-(3-dimethylaminobut-2-enylidene)-3-ethylrhodanine

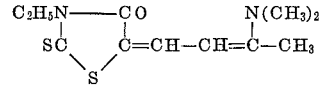

1 - anilino - 3 - dimethylimmonium-2-butene perchlorate (2.88 g.) and ethylrhodanine (1.6 g.) with acetic anhydride (1.0 cc.) and triethylamine (2.8 cc.) in ethanol (15 cc.), were refluxed together for ½ hr. and the solution was chilled. The product was filtered off, washed with a little ethanol, and recrystallized from ethanol as bright orange leaflets, M.P. 189° C.

The dye sensitized a silver chloride emulsion from 450 mμ to 560 mμ with a peak at 530 mμ.

EXAMPLE 3

5-(3-dimethylaminobut-2-enylidene)-3-ethoxycarbonylmethyl-rhodanine

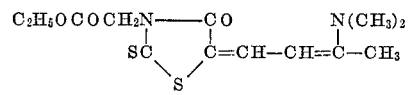

3-ethoxycarbonylmethyl-5 - ethoxymethylene - rhodanine (2.75 g.) and N,N-dimethylisopropylimmonium perchlorate (1.86 g.) with triethylamine (1.4 cc.) in ethanol (12 cc.) were refluxed for ½ hr. and the solution was chilled. The product was filtered off, washed with ethanol, and recrystallized from ethanol as orange leaflets, M.P. 162° C.

It sensitized a silver chlorobromide emulsion to 610 mμ with a peak at 550 mμ, and a silver bromoiodide emulsion to 600 mμ with a peak at 540 mμ.

EXAMPLE 4

2-(2-dimethylaminopropenyl)-3-ethylbenzothiazolium perchlorate

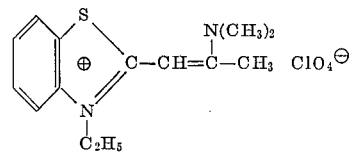

3-ethyl-2 - ethylthiobenzothiazolium p - toluenesulfonate (3.95 g.) and N,N-dimethylisopropylimmonium perchlorate (1.86 g.) with triethylamine (1.4 cc.) in ethanol (15 cc.), were refluxed together for ½ hr. and chilled. The product was filtered off, washed with ethanol, and recrystallized from methanol-ether as yellow needles, M.P. 240° C.

It increased the sensitivity to light of a polyvinylcinnamate coating.

The following examples will illustrate how representative dyes, such as Dye 2, and Dye 3 are further condensed to make complex dyes.

EXAMPLE 5

(3 - ethyl - 2 - benzothiazole)[5 - (3 - dimethylaminobut - 2 - enylidene) - 3 - ethyl - 4 - thiazolidinone] methincyanine iodide

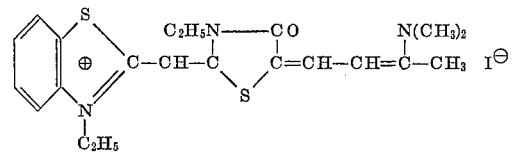

The dye Example 2 (0.26 g.) and methyl p-toluenesulfonate (0.2 g.) were fused at 120° for 1 hr. 3-ethyl-2-methylbenzothiazolium iodide (0.31 g.) triethylamine (0.14 cc.) and ethanol (5 cc.), were added and the solution was refluxed for 10 minutes, and then chilled. The product was filtered off, washed with ethanol, and recrystallized from ethanol-ether as dark green crystals, M.P. 252° C.

The dye sensitized a silver chlorobromide emulsion to 660 mμ with a peak at 600 mμ, and a silver bromoiodide emulsion to 640 mμ with a peak at 590 mμ.

EXAMPLE 6

(3 - ethyl - 2 - benzothiazole)[5 - (3 - dimethylaminobut - 2 - enylidene) - 3 - ethoxycarbonylmethyl - 4 - thiazolidinone]methincyanine iodide

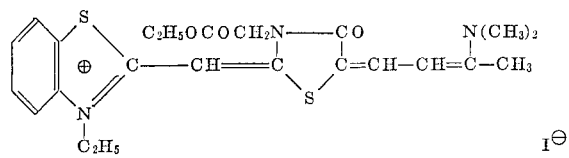

This dye, prepared as Example 5 from the intermediate dye of Example 3, was obtained from ethanol-ether as bronze leaflets, M.P. 240° C. with decomposition.

It sensitized a silver chlorobromide emulsion to 660 mμ with a peak at 590 mμ, and a silver bromoiodide emulsion to 640 mμ with a peak at 590 mμ.

EXAMPLE 7

5 - (3 - dimethylaminobut - 2 - enylidene) - 3 - ethoxycarbonylmethyl - 2 - (3 - ethoxycarbonylmethyl - 4 - oxo - 2 - thiothiazolidin - 5 - ylidene)thiazolid - 4 - one

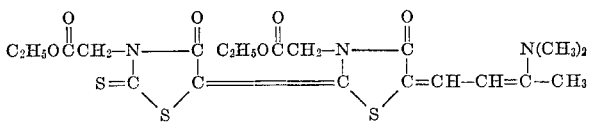

The dye Example 3 (1.6 g.) and methyl p-toluenesulfonate (1 g.) were fused together at 120° for ½ hr. 3-ethoxycarbonylmethyl-rhodanine (1.4 g.), triethylamine (0.7 cc.) and ethanol (10 cc.), were added and the solution was refluxed for 5 minutes, and chilled. The product was filtered off, washed with ethanol and ether, and recrystallized from benzene-light petroleum as maroon leaflets, M.P. 270° C.

It sensitized a silver chlorobromide emulsion to 680 mμ with a peak at 620 mμ, and a silver bromoiodide emulsion to 670 mμ with a peak from 570–620 mμ.

EXAMPLE 8

2-(4-dimethylaminopenta-1,3-dienyl)-3-ethylbenzothiazolium perchlorate

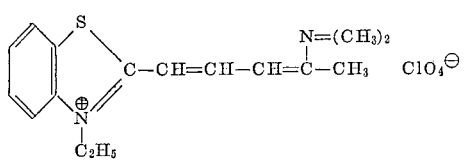

3-ethyl-2-methylbenzothiazolium iodide (1.5 g.), 1-anilino-3-dimethylimmonium-1-butene perchlorate (1.4 g.), acetic anhydride (0.5 ml.) and triethylamine (1.4 g.) in ethanol (10 cc.) were refluxed together for 20 minutes, and chilled. The product was filtered off, washed with ethanol and recrystallized repeatedly from methanol to give cherry needles, M.P. 246° C.

In a similar fashion other dyes are prepared from N,N-dimethylisopropylimmonium perchlorate, 1-anilino-3-dimethylimmonium-1-butene perchlorate and 1-acetanilido-3-dimethylimmonium-1-butene perchlorate according to the synthesis of my invention.

N,N-dimethylisopropylimmonium perchlorate

This was prepared according to Malhotra, D. Phil. Thesis, Oxford 1958. Acetone (15.5 cc.) and dimethylamine perchlorate (27.5 g.) were mixed, warmed to dissolve, and kept at room temperature overnight. The product was filtered off and recrystallized from acetic acid as colorless needles, M.P. 285° C., in 30 g. yield.

Similarly the other compounds of Formula I are made by using the appropriate ketone in place of acetone in order to give a compound having the desired R and R' groups.

1-anilino-3-dimethylimmonium-2-butene perchlorate

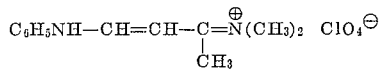

N,N-dimethylisopropylimmonium perchlorate (1.85 g.) and ethylisoformanilide (1.55 g.) were heated together at 140° for ½ hr. The mix was cooled, filtered, and then the product washed with ether, and recrystallized from methanol as orange crystals, M.P. 230° C.

1-acetanilido-3-dimethylimmonium-2-butene perchlorate

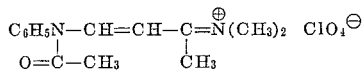

1-anilino-3-dimethylimmonium-2-butene perchlorate (1 g.) and acetic anhydride (8 cc.) were refluxed for 20 minutes. The cooled liquid was thrown into ether (40 cc.). The product which separated was heated several times with ether and recrystallized from methanol as pale cream leaflets, M.P. 158° C.

The synthesis of my invention is valuable for making sensitizing dyes of the styryl class, the hemicyanine class, the merocyanine class and certain complex dyes derived from the above dyes. These dyes are readily made by condensing N,N-dimethylisopropylimmonium perchlorate with intermediates, such as aromatic aldehydes, 2-alkylthio heterocyclic quaternary salts, alkoxymethylene derivatives of ketomethylene heterocyclic compounds, ethylisoformanilide, etc., or by condensing 1-anilino or 1-acetanilido-3-dimethylimmonium-2-butene perchlorate with intermediates such as heterocyclic quaternary salts possessing reactive methyl groups, ketomethylene heterocyclic compounds, etc.

The invention has been described in detail with particular reference to preferred embodiments thereof but it will be understood that variations and modifications can be effected within the spirit and scope of the invention as described hereinbefore.

I claim:

1. A photographic silver halide emulsion containing a dye selected from the dyes having the formulas:

I 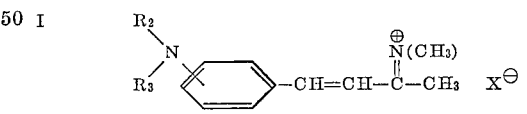

II 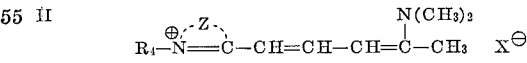

and

III 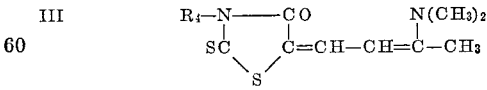

wherein $R_2$ and $R_3$ each represents a member selected from the group consisting of the hydrogen atom, an alkyl group having 1 to 5 carbon atoms, 2-chlorethyl, 2-cyanoethyl, 2-hydroxyethyl, benzyl, phenyl, chlorophenyl, methylphenyl and ethylphenyl; $R_4$ represents a member selected from the group consisting of an alkyl group having 1 to 5 carbon atoms, allyl, ethoxycarbonylmethyl, β-hydroxyethyl, β-acetoxyethyl and sulfobutyl; Z represents the nonmetallic atoms necessary to complete a heterocyclic nucleus selected from the group consisting of a thiazole nucleus, a benzothiazole nucleus, a naphthothiazole nucleus, a thionaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a 3,3-dialkyl-3H-indole nucleus, a pyridine nucleus, a 2-pyridine nucleus, a 4-pyridine nucleus, an imidazole nucleus, a naphthimidazole nucleus and a benzimidazole nucleus and $X^\ominus$ represents an acid anion.

2. A photographic silver halide emulsion in accordance with claim 1 wherein a dye having the general Formula I is present in the photographic emulsion.

3. A photographic silver halide emulsion in accordance with claim 1 wherein a dye having the general Formula II is present in the photographic emulsion.

4. A photographic silver halide emulsion in accordance with claim 1 wherein a dye having the general Formula III is present in the photographic emulsion.

5. A photographic silver halide emulsion in accordance with claim 1 containing a dye having the general formula:

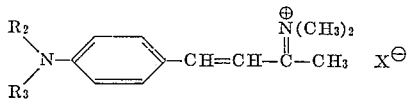

wherein $R_2$ and $R_3$ each represents a member selected from the group consisting of the hydrogen atom, an alkyl group having 1 to 5 carbon atoms, 2-chloroethyl, 2-cyanoethyl, 2-hydroxyethyl, benzyl, phenyl, chlorophenyl, methylphenyl and ethylphenyl and $X^\ominus$ represents an acid anion.

6. A photographic silver halide emulsion in accordance with claim 3 wherein $R_4$ represents an alkyl group having 1 to 5 carbon atoms and Z represents the nonmetallic atoms necessary to complete a benzothiazole nucleus.

7. A photographic silver halide emulsion containing a dye selected from the group consisting of 1-p-dimethylaminophenyl - 3 - dimethylimmonium - 1 - butene perchlorate, 2,2 - dimethylaminopropenyl - 3 - ethylbenzothiazolium perchlorate, 5-(3 - dimethylaminobut-2-enylidene) - 3 - ethoxycarbonylmethylrhodanine, 5 - (3 - dimethylaminobut-2-enylidene) - 3 - ethylrhodanine and (3-ethyl-2-benzothiazole) [5 - (3 - dimethylaminobut - 2-enylidene) - 3 - ethyl - 4 - thiazolidinone]methincyanine iodide.

8. A photographic silver halide emulsion in accordance with claim 7 containing the dye 1 - p - dimethylaminophenyl-3-dimethylimmonium-1-butene perchlorate.

9. A photographic silver halide emulsion in accordance with claim 7 containing the dye 2,2 - dimethylaminopropenyl-3-ethylbenzothiazolium perchlorate.

10. A photographic silver halide emulsion in accordance with claim 7 containing the dye 5 - (3-dimethylaminobut - 2 - enylidene) - 3 - ethoxycarbonylmethylrhodanine.

11. A photographic silver halide emulsion in accordance with claim 7 containing the dye 5-(3 - dimethylaminobut-2-enylidene)-3-ethylrhodanine.

12. A photographic silver halide emulsion in accordance with claim 7 containing the dye (3-ethyl-2-benzothiazole) [5-(3-dimethylaminobut-2-enylidene)-3-ethyl-4-thiazolidinone]methincyanine iodide.

References Cited
UNITED STATES PATENTS

| | | | |
|---|---|---|---|
| 2,166,736 | 7/1939 | White et al. | 96—102 |
| 2,186,608 | 1/1940 | Keyes | 96—102 |
| 2,298,732 | 10/1942 | Brooker et al. | 96—102 |
| 2,298,733 | 10/1942 | Brooker et al. | 96—102 |

J. TRAVIS BROWN, Primary Examiner

U.S. Cl. X.R.

96—106